US007775307B2

(12) United States Patent
Cheng

(10) Patent No.: US 7,775,307 B2

(45) Date of Patent: Aug. 17, 2010

(54) POWER WHEELCHAIR

(75) Inventor: Ming-Chuan Cheng, Taichung (TW)

(73) Assignee: Merite Health Products Co., Ltd., Taichung (TW)

( * ) Notice: Subject to any disclaimer, the term of this patent is extended or adjusted under 35 U.S.C. 154(b) by 660 days.

(21) Appl. No.: 11/739,809

(22) Filed: Apr. 25, 2007

(65) Prior Publication Data

US 2008/0264702 A1 Oct. 30, 2008

(51) Int. Cl.
*B62D 61/10* (2006.01)
*B60K 1/00* (2006.01)

(52) U.S. Cl. ........................ 180/22; 180/65.1; 180/907; 280/755

(58) Field of Classification Search ................... 180/22, 180/65.1, 907; 280/124.104, 124.116, 124.129, 280/250.1, 650, 755
See application file for complete search history.

(56) References Cited

U.S. PATENT DOCUMENTS

| | | | | |
|---|---|---|---|---|
| 3,520,378 | A * | 7/1970 | Slay | 180/21 |
| 5,848,658 | A * | 12/1998 | Pulver | 180/65.1 |
| 5,944,131 | A * | 8/1999 | Schaffner et al. | 180/65.1 |
| 5,964,473 | A * | 10/1999 | Degonda et al. | 280/250.1 |
| 6,070,898 | A * | 6/2000 | Dickie et al. | 280/304.1 |
| 6,073,951 | A * | 6/2000 | Jindra et al. | 280/304.1 |
| 6,129,165 | A * | 10/2000 | Schaffner et al. | 180/65.1 |
| 6,196,343 | B1 * | 3/2001 | Strautnieks | 180/22 |
| 6,460,641 | B1 * | 10/2002 | Kral | 180/24.02 |
| 6,543,798 | B2 * | 4/2003 | Schaffner et al. | 280/250.1 |
| 6,923,278 | B2 * | 8/2005 | Mulhern et al. | 180/65.1 |
| 7,040,429 | B2 * | 5/2006 | Molnar | 180/65.1 |
| 7,066,290 | B2 * | 6/2006 | Fought | 180/65.51 |
| 7,104,346 | B2 * | 9/2006 | Schaffner | 180/65.1 |
| 7,175,193 | B2 * | 2/2007 | Wu | 280/304.1 |
| 7,232,008 | B2 * | 6/2007 | Levi et al. | 280/763.1 |
| 7,234,554 | B2 * | 6/2007 | Mulhern et al. | 180/65.6 |
| 7,264,272 | B2 * | 9/2007 | Mulhern et al. | 280/755 |
| 7,306,247 | B2 * | 12/2007 | Wu | 280/124.128 |
| 7,314,220 | B2 * | 1/2008 | Turturiello et al. | 280/5.5 |
| 7,370,876 | B2 * | 5/2008 | Hsu et al. | 280/650 |
| 7,380,824 | B2 * | 6/2008 | Chen et al. | 280/755 |
| 7,389,835 | B2 * | 6/2008 | Mulhern et al. | 180/22 |
| 7,490,683 | B2 * | 2/2009 | Schaffner | 180/65.1 |
| 7,556,109 | B2 * | 7/2009 | Chen et al. | 180/65.1 |
| 2004/0084230 | A1 * | 5/2004 | Grymko et al. | 180/65.1 |
| 2005/0077715 | A1 * | 4/2005 | Mulhern et al. | 280/755 |
| 2008/0157513 | A1 * | 7/2008 | Cheng | 280/755 |
| 2009/0050381 | A1 * | 2/2009 | Cheng | 180/54.1 |

* cited by examiner

*Primary Examiner*—Paul N Dickson
*Assistant Examiner*—Laura Freedman
(74) *Attorney, Agent, or Firm*—Browdy and Neimark, PLLC

(57) ABSTRACT

A power wheelchair includes a frame, on which a pair of front wheel sets, a pair of middle wheel sets, a pair of rear wheel sets and a pair of elastic devices are provided. Each of the front wheel sets includes a front wheel mount having a first connection portion pivoted to the frame, and a second connection portion connected to a front wheel. Each of the middle wheel sets includes a middle wheel mount having a first connection portion pivoted on the frame, and a second connection portion, connected to a middle wheel. The elastic device are provided between the front wheel mounts and the middle wheel mounts respectively to cushion a swing of the front wheel set and the middle wheel set relative to the frame.

8 Claims, 6 Drawing Sheets

POWER WHEELCHAIR

BACKGROUND OF THE INVENTION

1. Field of the Invention

The present invention relates generally to a wheelchair, and more particularly to a power wheel, which may drive on a rough road.

2. Description of the Related Art

A conventional power wheelchair has a frame, on which two front wheels, two driving wheels and two rear wheels are provided on a front, middle and rear thereof respectively. The frame also is provided with two front wheel mounts and two driving wheel mounts on left and right sides to pivot the front wheels and the driving wheels thereon respectively. However, the front wheel mounts and the driving wheel mounts are rigid bodies and made in an integral with the frame, so that the wheelchair is hard to drive on a rough road. To overcome above problem, some had provided the front wheel mounts and the driving wheel mounts independently pivoted on the frame with a distance therebetween and two coupling assemblies connecting the front wheel mounts and the driving wheel mounts respectively. The front wheel mounts and the driving wheel mounts may be moved relatively to the frame independently and the coupling assemblies provide connections between the front wheel mounts and the driving wheel mounts to make the front wheels and the driving wheels keep in touch on the ground to stabilize the wheelchair. In addition, there are cushion devices between the front and driving wheel mounts and the frame to absorb vibration that make user sit on the wheelchair more comfortable.

However, the coupling assemblies, which connect the front wheel mounts and the driving wheel mounts to keep them in touch on the ground, usually are very complex. Typically, the coupling assembly is a multi-linkage mechanism including a plurality of links with various lengths. This kind of multi-linkage mechanism is hard to design and assemble and has a high cost. Furthermore, stress always concentrates at pivots between the links that means the coupling assembly cannot work for a long time. Again, the cushion devices are adjacent to a seat of the wheelchair that vibration transmits to the seat through the cushion devices. As a result, the user is not comfortable to sit on the wheelchair and the cushion capacity of the wheelchair is limited also.

SUMMARY OF THE INVENTION

The primary objective of the present invention is to provide a power wheelchair, which provides the front wheel mount and the middle wheel mount pivoted on the same position of the frame to replace the conventional structure, which the front wheel mount, and driving wheel mount and the frame are a rigid body. Furthermore, the power wheelchair of the present invention provides an elastic device between the front wheel mount and the middle wheel mount for vibration absorption. The power wheelchair of the present invention has advantages of simple structure, easy to design and manufacture, lower manufacture cost, easy to repair, and longer durability.

According to the objective of the present invention, a power wheelchair includes a frame, on which a pair of front wheel sets, a pair of middle wheel sets, a pair of rear wheel sets and a pair of elastic devices are provided. The frame has two pivot portions at opposite sides thereof. Each of the front wheel sets includes a front wheel mount having a first connection portion, which is pivoted to the pivot portion of the frame, and a second connection portion, and a front wheel connected to the second connection portion of the front wheel mount. Each of the middle wheel sets includes a middle wheel mount having a first connection portion, which is pivoted on the pivot portion of the frame, and a second connection portion, and a middle wheel connected to the second connection portion of the middle wheel mount. The elastic device are provided between the front wheel mounts and the middle wheel mounts respectively to cushion a swing of the front wheel set and the middle wheel set relative to the frame.

DETAILED DESCRIPTION OF THE INVENTION

Figure 1:
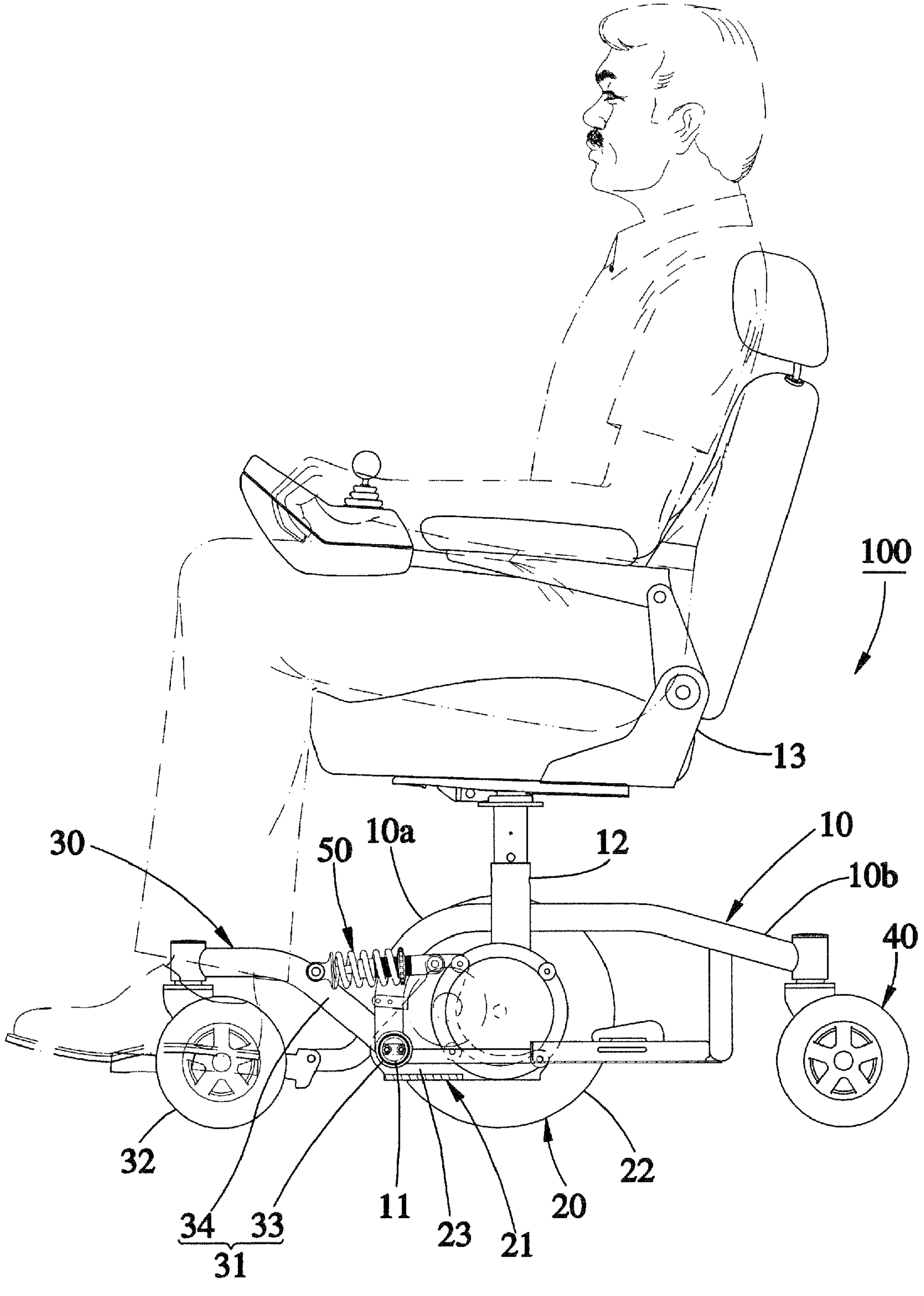
FIG. 1 is a lateral view of a preferred embodiment of the present invention.
Figure 2:
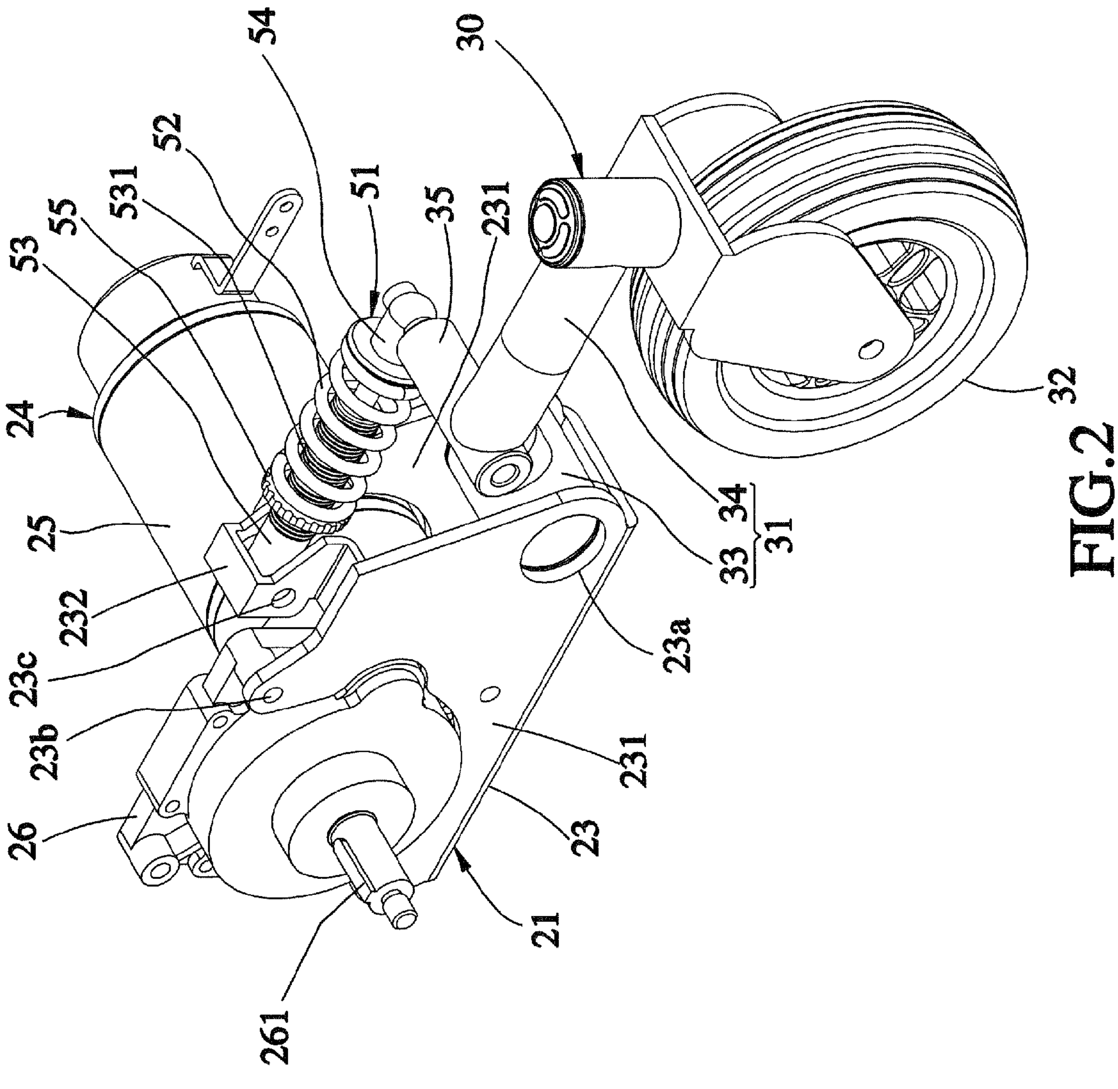
FIG. 2 is a perspective view of the front wheel mount, the middle wheel mount and the rear wheel mount of the preferred embodiment of the present invention.

As shown in FIG. 1 to FIG. 6, a power wheelchair 100 of the preferred embodiment of the present invention includes a frame 10, a pair of middle wheel sets 20, a pair of front wheel sets 30, a pair of rear wheel sets 40 and a pair of elastic devices 50.

The frame 10 has a front 10*a* and a rear 10*b*. In the present invention, the frame 10 has two pivot portions 11 at opposite sides of a bottom of the front 10*a*. The pivot portions 11 are tubular members projected outwards. The frame 10 further has an upright support tube 12 behind the pivot portions 11 and a seat set 13 mounted on the support tube 12.

Each of the middle wheel sets 20 includes a middle wheel mount 21 and a middle wheel 22 pivoted on the middle wheel mount 21. In the present invention, the middle wheel sets 20 are the driving wheel sets, each of which includes a frame base 23 and a transmission device 24.

Figure 3:
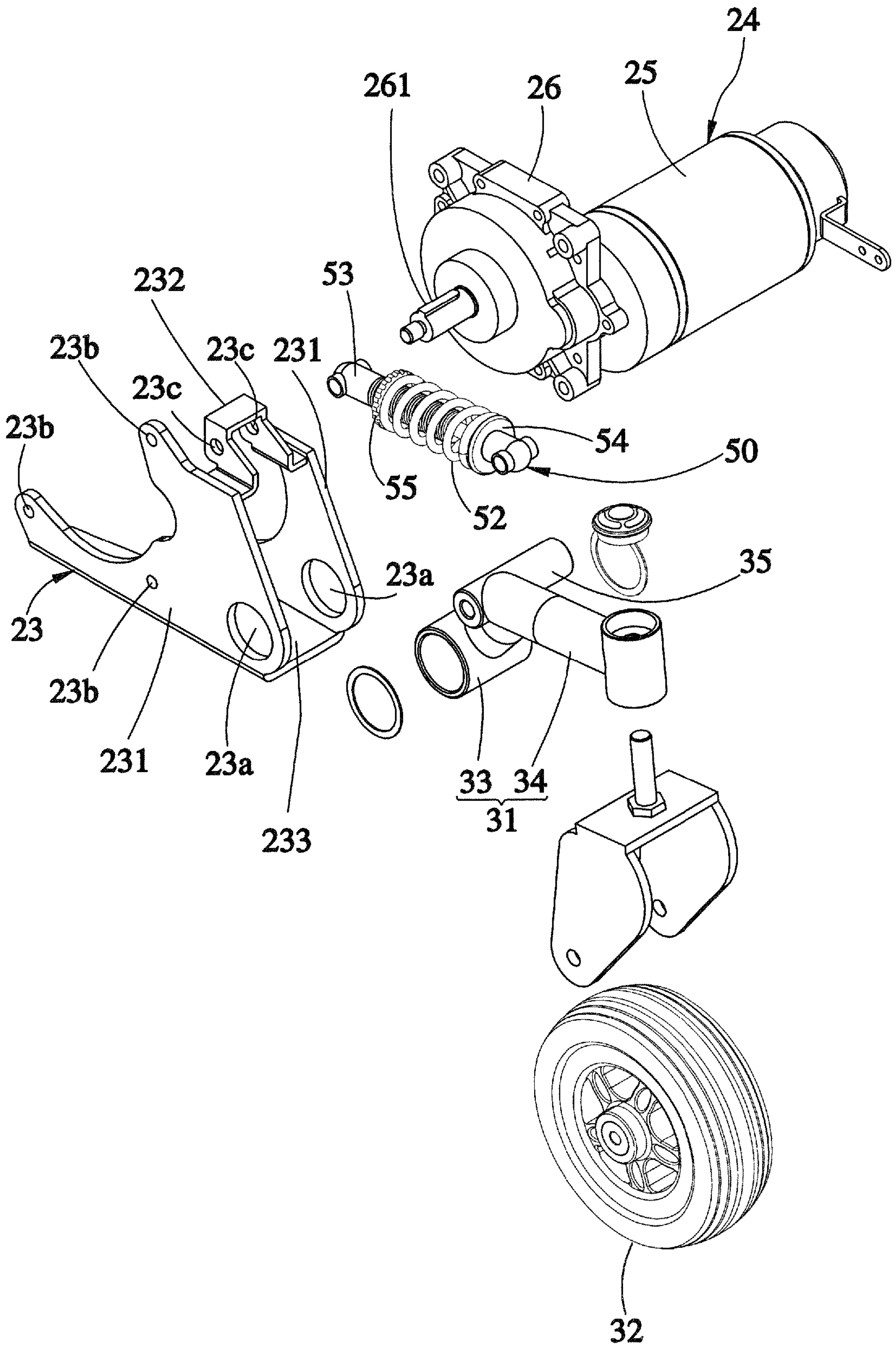
FIG. 3 is an exploded view of FIG. 2.
Figure 4:
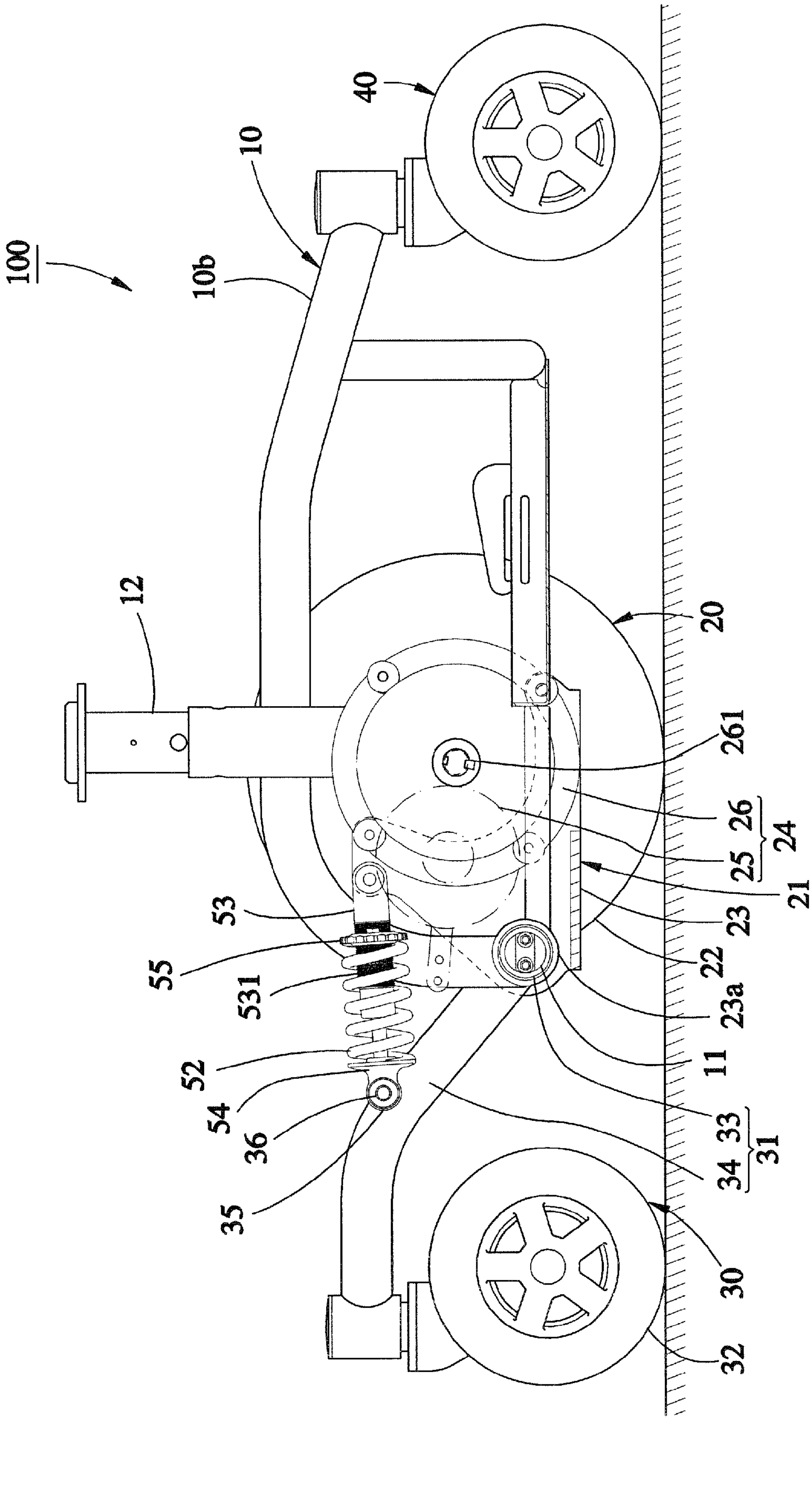
FIG. 4 is a sketch diagram of the preferred embodiment of the present invention, showing the power wheelchair running on a flat road.

As shown in FIG. 3, the frame base 23 includes two parallel lateral plates 231, a top plate 232 connected to the lateral plates 231 and a bottom plate 233, each of which includes a hole 23*a*. In the present invention, the frame base 23 has the hole 23*a* on a bottom thereof to form a first hole portion, which constructs a first connection portion of the middle wheel mount 21 to be pivoted with the pivot portion 11 of the frame 10 that the frame base 23 may swing relative to the frame 10. The outer lateral plate 231 has three fixing holes 23*b*, and the top plate 233 has two axial holes 23*c*, which construct a second hole portion on a top of the frame base 23.

The transmission device 24 has a motor 25 and a gear box 26, which is fixed to the lateral plate 231 by bolts (not shown) through the fixing holes 23*b*. The gear box 26 has a shaft 261 that form a second connection portion of the middle wheel mount 21. The shaft 261 is connected to the middle wheel 22 to drive the middle wheel 22 running. The shaft 261 is behind the hole 23*a* to make the middle wheel 22, with the pivot portion 11 to be a center of swing, swing toward the front 10*a* of the frame 10.

Each of the front wheel sets 30 includes a front wheel mount 31 and a front wheel 32 pivoted on the front wheel mount 31. The front wheel mount 31 has a tube 33 to form a first connection portion and a wheel frame 34 extended from the tube 33 to the front of the frame 10. A front of the wheel frame 34 forms a second connection portion of the front wheel mount 31 to be pivoted with the front wheel 32. In assembly, the tube 33 is between the lateral plates 231 to have the pivot portion 11 of the frame 10 through the holes 23*a* of the lateral plates 231 and the tube 33 for pivot with the front wheel mount 31 that the front wheel sets may swing relative to the frame 10. The wheel frame 34 has a lateral frame 35 at a middle thereof. The lateral frame 35 is projected inward, which has a third hole portion 36.

In the present invention, each of the rear wheel sets 40 is fixed to opposite sides of the rear 10*b* of the frame 10. Of course, the rear wheel sets 40 may be pivoted on the frame 10 also.

Each of the elastic devices 50 includes a cushion member 51 and a compression spring 52 in the present invention. The cushion member 51 includes a cylinder 53, a piston 54 and an adjusting member 55. The cylinder 53, which includes an outer threaded section 531, has an end pivoted on the second hole portion (i.e. the axial holes 23*c* of the top plate 232) of the middle wheel mount 21. The piston 54 has an end pivoted on the third hole portion 36 of the lateral frame 35 and the other end inserted into the cylinder 53 to be moved relative to the cylinder 53. The adjusting member 55 is screwed onto the outer threaded section 531 of the cylinder 53 to be turned for movement forward and backward that the cylinder 53 urges an against portion of the compression spring 52. The compression spring 52 has opposite ends urging the adjusting member 55 and the piston 54 to cushion a swing of the front wheel mount 31 and the middle wheel mount 21 relative to the frame 10.

Above is the structure of the power wheelchair 100 of the present invention. The action of the power wheelchair 100 is described hereunder.

Figure 5:
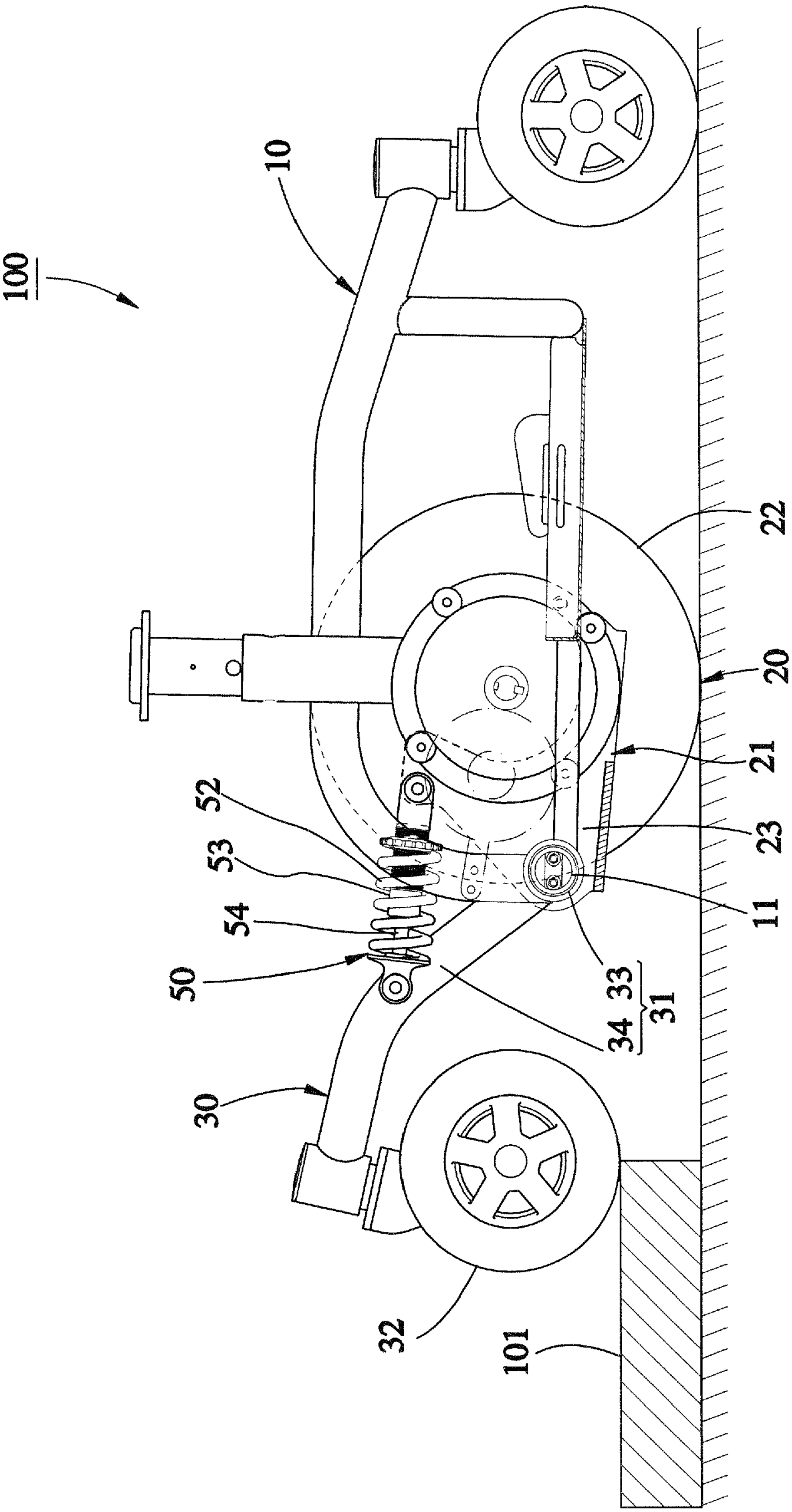
FIG. 5 is a sketch diagram of the preferred embodiment of the present invention in operation, showing the front wheel running on a rough road.
Figure 6:
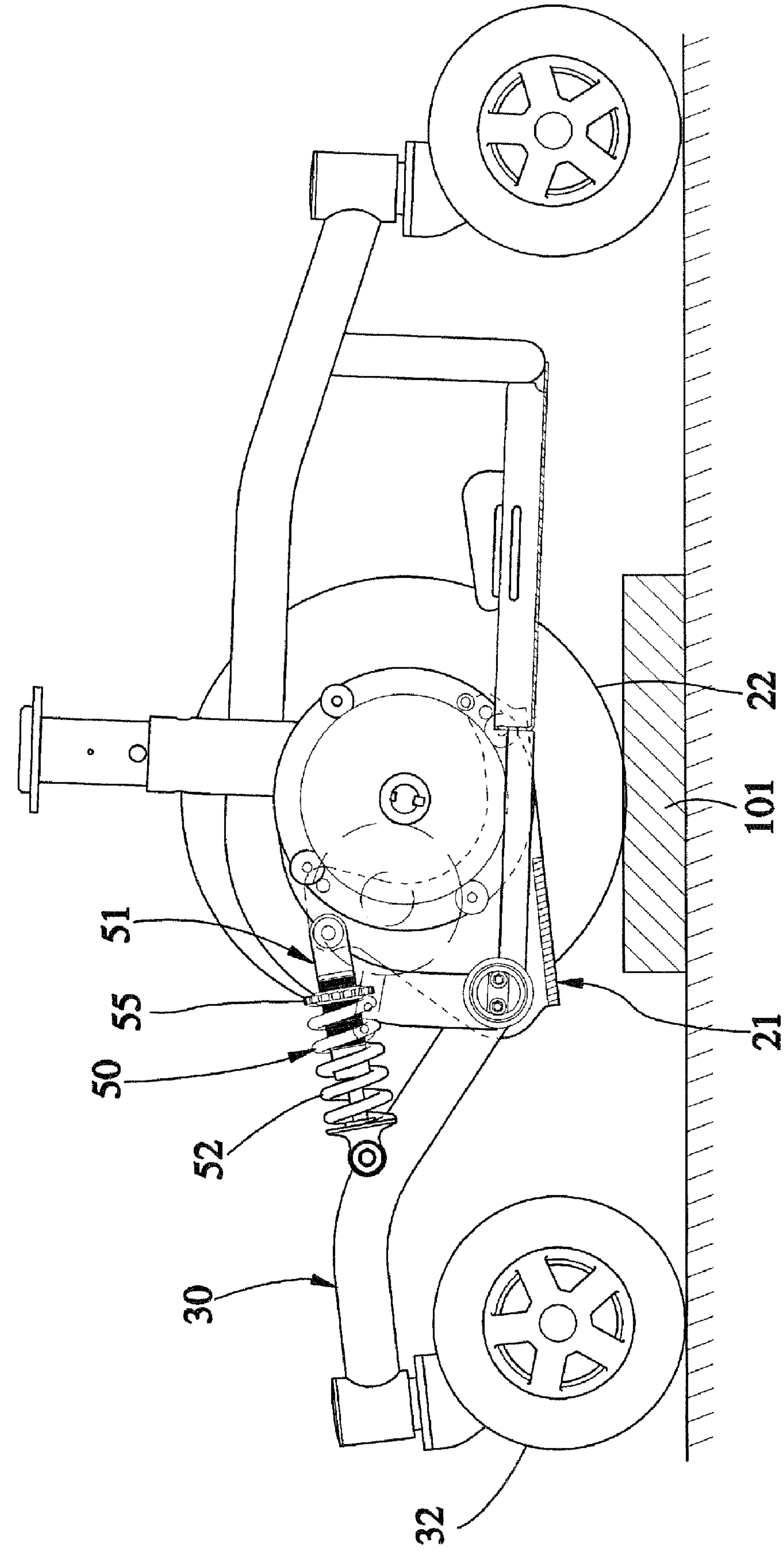
FIG. 6 is a sketch diagram of the preferred embodiment of the present invention in operation, showing the middle wheel running on a rough road.

As shown in FIG. 5 and FIG. 6, when the power wheelchair 100 runs on a rough road (it shows a protrusion 101 in the drawings), the front wheel 32 touches the protrusion 101 first, and the middle wheel 22 drives the power wheelchair 100 keeping moving forward. The front wheel mount 31 of the front wheel set 30 is raised with the pivot portion 11 of the frame 10 being a fulcrum to drive the front wheel 32 climbing over the protrusion 101, and, in the same time, raise the elastic device 50 that makes the piston 54 moving into the cylinder 53 and compressing the compression spring 52 to absorb the impact when the front wheel 32 hits the protrusion 101 and the return force of the compression spring 52 to stabilize the wheelchair 100. In addition, the middle wheel mount 21 is moved downward by the elastic device 50 to press the middle wheel 22 and the front wheel 33 on the ground to stabilize the wheelchair 100 and make the middle wheel 22 keeping driving the wheelchair 100 forward. When the front wheel 32 has crossed the protrusion 101 and the middle wheel 22 touches the protrusion 101, as shown in FIG. 6, the middle wheel mount 21 is raised. In the same time, the elastic device 50 absorbs the impact when the middle wheel 22 hits the protrusion and drives the front wheel set 30 moving downward to have the front wheel 32 pressing the ground to stabilize the wheelchair 100.

In addition, the compression spring 52 may be adjusted by turning the adjusting member 55 of the cushion member 51 to match different users and rounds that the power wheelchair 100 of the present invention can meet any condition.

In conclusion, the present invention provides the front wheel mounts 31 and the middle wheel mounts 21 pivoted on the pivot portions 11 of the frame 10 respectively to fix the problem of the conventional wheelchair, which the front wheel mount and the driving wheel mount are fixed together as a rigid body. The present invention further provides the elastic devices 50 between the front wheel mounts 31 and the middle wheel mounts 21 respectively to replace the complex coupling device of the conventional wheelchair. The power wheelchair 100 of the present invention has advantages of simple structure, easy to design and manufacture, lower manufacture cost, easy to repair, and longer durability, furthermore, it can stably run on the rough roads. The elastic devices 50 do not directly contact or close to the seat set 13 so that the vibration is absorbed by the elastic devices 50 rather than transmits to the seat set 13 to make user sits on the seat set 13 more comfortable.

The power wheelchair of the present invention may be designed to have the front wheels or the rear wheels to be the driving wheels rather than the middle wheels as described in the embodiment. The elastic devices may be provided between the middle wheel mounts and the rear wheel mounts also, and the elastic device may use other type of spring, such as torsion spring. The torsion spring may have opposite ends urging the front wheel mount and the middle wheel mount that the torsion spring may absorb the impact and connect the front wheel mount and the middle wheel mount, furthermore, it provides a simpler structure.

The description above is a few preferred embodiments of the present invention and the equivalence of the present invention is still in the scope of the claim of the present invention.

What is claimed is:

1. A power wheelchair comprising:

a frame including a front, a rear and two pivot portions at opposite sides thereof;

a pair of front wheel sets on the opposite sides of the front of the frame, wherein each of the front wheel sets includes a front wheel mount having a first connection portion, which is pivoted to the pivot portion of the frame, and a second connection portion, which is more distal to the frame than the first connection portion, and a front wheel connected to the second connection portion of the front wheel mount;

a pair of middle wheel sets on the opposite sides of the frame between the front and the rear, wherein each of the middle wheel sets includes a middle wheel mount having a first connection portion, which is pivoted on the pivot portion of the frame, and a second connection portion, which is more distal to the frame than the first connection portion, and a middle wheel connected to the second connection portion of the middle wheel mount;

a pair of rear wheel sets on the opposite sides of the rear of the frame; and a pair of elastic devices, each of which is provided between the front wheel mount and the middle wheel mount to cushion a swing of the front wheel set and the middle wheel set relative to the frame, wherein the middle wheel mount includes a frame base with a first hole portion to form the first connection portion and a transmission device, and each of the pivot portions of the frame is a tube through the first hole portion to be pivoted on the frame base and through the first connection portions of the front wheel sets to be pivoted on the front wheel mount respectively, and each of the transmission devices has a shaft to form the second connection portion for connection of the middle wheel respectively.

2. The power wheelchair as defined in claim 1, wherein each of the elastic devices has opposite ends pivoted on the front wheel mount and the middle wheel mount respectively.

3. The power wheelchair as defined in claim 2, wherein each of the elastic devices has a cushion member, which includes a cylinder with an end pivoted on the middle wheel mount and having a piston with an end pivoted on the front wheel mount and the other end inserted into the cylinder and a compression spring with opposite ends urging the cylinder and the piston.

4. The power wheelchair as defined in claim 3, wherein the cylinder includes an outer threaded section, and the cushion member includes an adjusting member screwed onto the outer threaded section of the cylinder to be turned for movement forward or backward relative to the cylinder.

5. The power wheelchair as defined in claim 1, wherein each of the middle wheel mounts has a second hole portion between the first connection portion and the second connection respectively, and each of the front wheel mounts has a third hole portion between the first connection portion and the second connection respectively, and each of the elastic devices has opposite ends connected to the second hole portion and the third hole portion.

6. The power wheelchair as defined in claim 5, wherein the frame base includes two parallel lateral plates, each of which has a hole to from the first hole portion of the frame base, and a top plate, which has two parallel axial holes to form the second hole portion, connected to the lateral plates, and the front wheel mount has a tube, which forms the first connection portion, between the lateral plates, and the pivot portion of the frame passes through the holes and the tube.

7. The power wheelchair as defined in claim 6, wherein each of the front wheel mounts includes a wheel frame connected to the tube and extended to the front of the frame to from the second connection portion at a front thereof for connection of the front wheel, and each of the wheel frames has a lateral frame, which has the third hole portion, between the first connection portion and the second connection portion.

8. The power wheelchair as defined in claim 1, further comprising a seat set mounted on a support tube of the frame between the front and the rear, wherein the support tube is more proximal to the rear wheel sets than the pivot portions of the frame.

* * * * *